United States Patent
Stouffer

[19]

[11] Patent Number: 6,098,334
[45] Date of Patent: Aug. 8, 2000

[54] TIMER SYSTEM FOR A CAGE

[76] Inventor: John D. Stouffer, 14228 State Rd., Granger, Ind. 46530

[21] Appl. No.: 09/378,981

[22] Filed: Aug. 23, 1999

[51] Int. Cl.[7] .......................... A01M 23/00; A01M 23/18
[52] U.S. Cl. ..................................... 43/58; 43/61
[58] Field of Search ................... 43/58, 60, 61; 368/10, 72–74, 80, 223, 228

[56] References Cited

U.S. PATENT DOCUMENTS

| | | | |
|---|---|---|---|
| 3,474,617 | 10/1969 | Robinson et al. | 368/72 |
| 3,564,836 | 2/1971 | Boyles | 368/72 |
| 4,122,660 | 10/1978 | Canavan | 368/73 |
| 4,890,415 | 1/1990 | Fressola et al. | 43/61 |
| 5,027,547 | 7/1991 | Livshin | 43/124 |
| 5,095,468 | 3/1992 | Sato | 368/72 |
| 5,325,625 | 7/1994 | Liu et al. | 43/114 |
| 5,471,782 | 12/1995 | Brittell | 43/121 |
| 5,694,378 | 12/1997 | Totsuka | 368/223 |
| 5,718,078 | 2/1998 | Therrien | 43/121 |
| 5,862,102 | 1/1999 | Trainello | 368/223 |
| 5,926,997 | 7/1999 | Wilcox | 43/60 |

FOREIGN PATENT DOCUMENTS 8-182456  7/1996  Japan .

Primary Examiner—Michael J. Carone
Assistant Examiner—Darren W. Ark
Attorney, Agent, or Firm—Leo H McCormick, Jr.

[57] ABSTRACT

A cage for trapping an animal having a timing system for indicating the time that the animal was trapped in an enclosure. The cage is defined by a housing having an opening therein with a door which is opened to allow an animal to enter the housing. A closure arrangement responds to the animal passing through the opening for closing the door to trap the animal in the housing. A clock, having a second hand, minute hand, hour hand and an indicator hand that move with respect to a dial face, is secured to the housing. A lever responsive to the closure of the door activates a switch to stop the clock and provide an indication of the time that the door was closed by the location of the hour hand and indicator hand. If the indicator hand is located on the left hand side of the hour hand an animal was trapped within the first twelve hours after the trap was set and if the indicator hand is on the right hand side of the hour hand the animal was trapped more than twelve hours after the trap was set.

6 Claims, 2 Drawing Sheets

TIMER SYSTEM FOR A CAGE

This invention relates to a timer system for determining the closure of a door upon entry of an animal into a cage.

BACKGROUND OF THE INVENTION

It is common practice for scientist to trap animals in the wilderness to study their habits and examine their health. Normally a scientist will set multiple cages in an area and come back within twenty-four hours to see if the cage has trapped anything. It is necessary to daily check the cages to prevent the animal from being stressed as after examination they are again released in the wilderness. From the location and number of animals in the cages the scientist is able to predict activities of animals from feeding and migration times since various animals often compete in a same location. Unfortunately such results are only approximate, as the scientist only knows an approximate time that the animal entered a cage, as currently available traps do not provide an indication as to when an animal entered the cage.

SUMMARY OF THE INVENTION

In an effort to provide a indication as to when an animal entered a cage, the timer system of the present invention gives a reading as to when a door is shut to a cage and from this information a scientist may better understand the activities of the animal. The cage defining an enclosure has an opening therein with a door which is opened to allow an animal to enter the enclosure. A closure member responds to the animal passing through the opening for closing the door to trap the animal in the enclosure. A clock having a second hand, minute hand, hour hand and an indicator hand that move over a dial is secured to the enclosure. A lever from a switch is responsive to the closure of the door to stop the clock and indicate the time that the door was closed by the relationship of the hour hand and indicator hand. The indicator hand being on the left hand side of the hour hand if the animal was trapped within the first twelve hours after the trap was set and on the right hand side of the hour hand if the animal was trapped more than twelve hours after the trap was set.

An advantage of the present invention resides in an indicator hand which is located on a left hand side of an hour hand of a clock if a door was closed within twelve hours and on a right hand side of the hour hand if the door is closed more than twelve hours after the cage was positioned in a location.

A further advantage of this invention is to provide a cage with a timer system to provide an indication as to when an animal entered an opening and was trapped in the cage.

A further advantage of this cage resided in the ability to set the indicator of a clock to time when it is positioned at a location.

DETAILED DESCRIPTION

Figure 1:
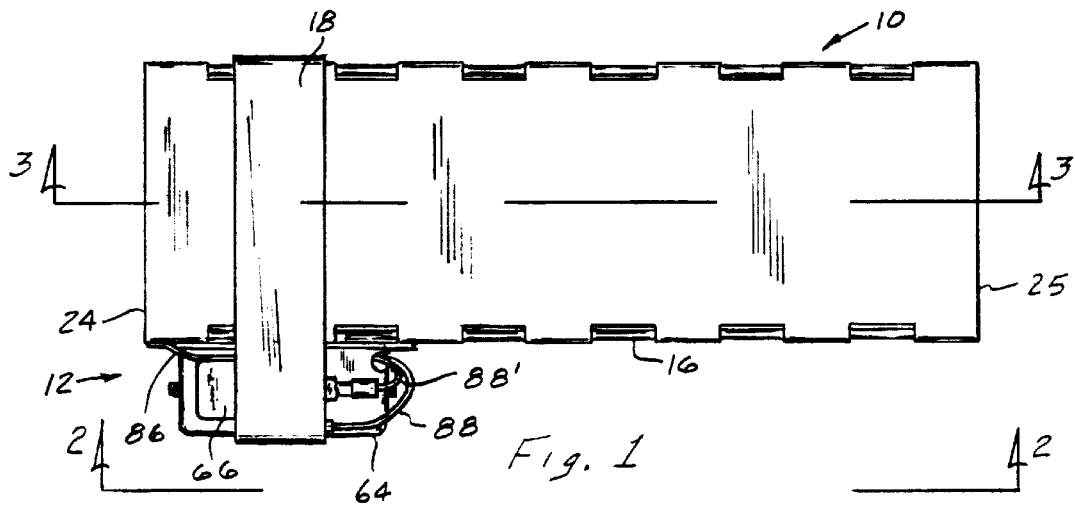
FIG. 1 is a schematic illustration of a cage with a timer arrangement made according to the present invention.
Figure 2:
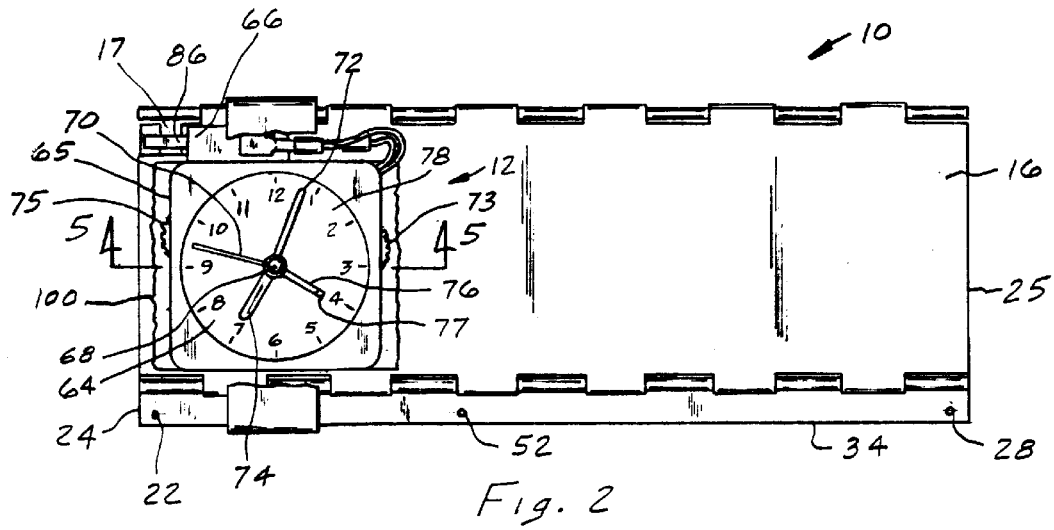
FIG. 2 is a plan view taken along line 2—2 of FIG. 1 showing a face for the timer in an actuated position.
Figure 3:
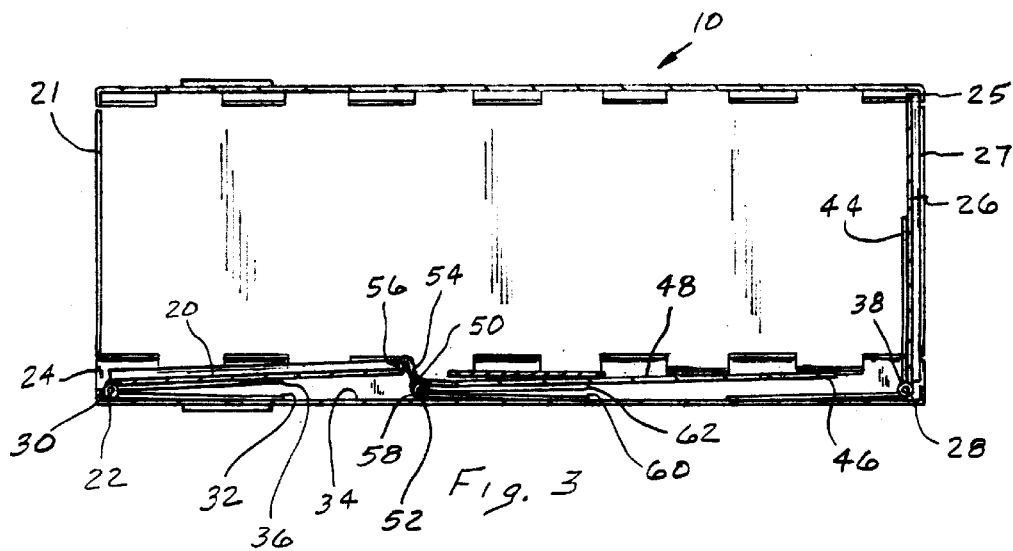
FIG. 3 is a sectional view taken along line 3—3 of FIG. 1 showing an entrance door to the cage in an opened position.
Figure 4:
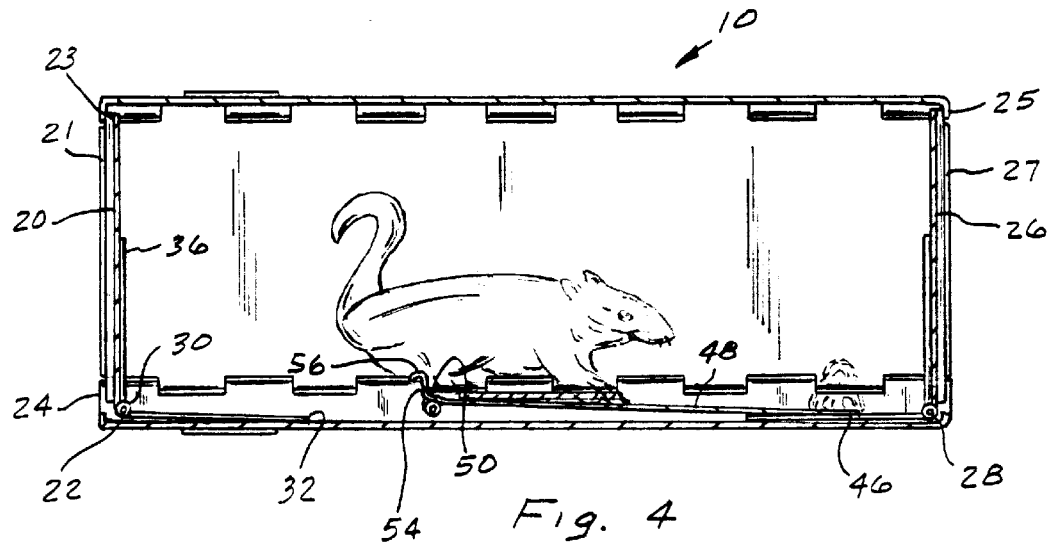
FIG. 4 is a sectional view of the structure of FIG. 3 showing the entrance door in a closed position.

A cage 10 as shown in FIGS. 1, 2 and 3 has a timer arrangement 12 that is attached to the side wall 16 by a flexible strap 18. The cage 10 has a first door 20 hinged on a first pin 22 to a first end 24 and a second door 26 hinged on a second pin 28 to a second end 25. A first spring 30 has coils which are wound around pin 22 with a first section 32 that engages floor 34 of the cage 10 and a second section 36 that engages the first door 20. The force of spring 30 acts on and urges door 20 toward a closed position as illustrated in FIG. 4. Similarly, a second spring 38 has coils which are wound around pin 28 with a first section 42 that engages floor 34 and a second section 44 that engages the second door 26. The force of spring 38 acts on and urges door 26 toward a closed position as illustrated in FIG. 4. A platform 48 has a first end 50 which is hinged on pin 52 and a second end 46 that extends toward the second door 26. Platform 48 has a projection 54 with a lip 56 that extends from the first end 50. A spring 58 that has coils are wound around pin 52 with a first projection 60 that engages floor 34 and a second projection 62 that engages platform 48. The force of spring 58 acts on and urges the second end 46 away from floor 34.

Figure 5:
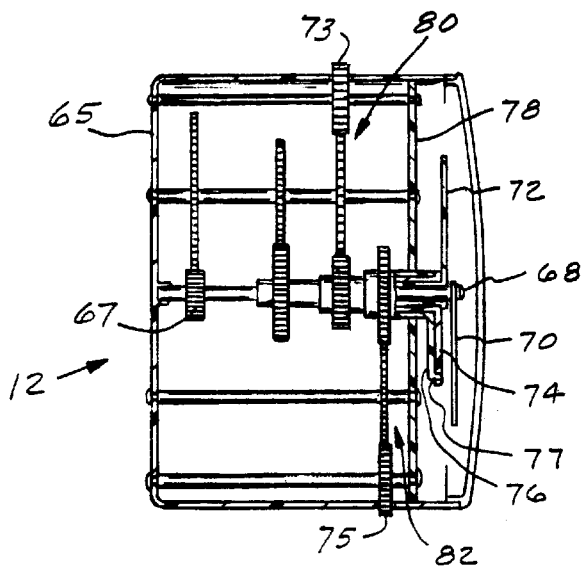
FIG. 5 is a sectional view taken along line 5—5 of FIG. 2 illustrating various gears for the timer.

The timer arrangement 12 as best illustrated in FIGS. 2 and 5 includes a battery-powered clock 64 with an off-on switch 66.

Figure 6:
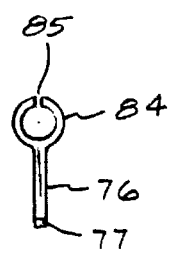
FIG. 6 is a view of the indicator hand for the timer of FIG. 5.

Clock 64 has a central axle 68 on which a second hand 70, a minute hand 72, an hour hand 74 and an indicator hand 76 are located over a dial 78. The position of the minute hand 72 and hour hand 74 may be adjusted by knob 73 associated with gear arrangement 80 while the position of the indicator hand 76 may be adjusted by knob 75 associated with gear arrangement 82. The second hand 70, minute hand 72, hour hand 74 and indicator hand 76 have corresponding hubs which surround and frictionally engage axle 68 however the hub 84 for the indicator hand 76 has a gap 85 removed therefrom, as best shown in FIG. 6, to reduce the frictional engagement. Further, indicator hand 76 has a perpendicular projection 77 that extends in a direction parallel to the hub 84.

Figure 7:
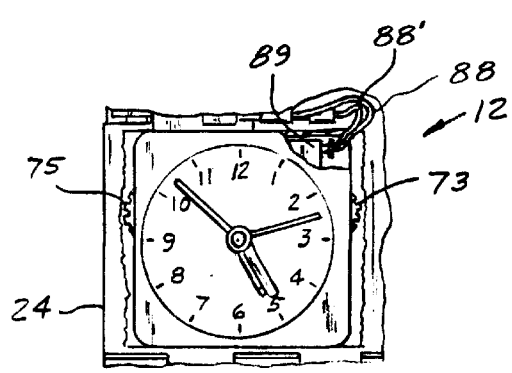
FIG. 7 is a view of the clock face for the timer an indicator position.

The off-on switch 66 which is attached to the housing 65 of clock 64 has an arm 86 that extends through an opening 17 in side wall 1 6 and various leads 88,88' that are connected to a battery 89, as shown in FIG. 7, for clock 64.

MODE OF OPERATION

When a person decides to place a cage 10 at a particular location, clock 64 is attached thereto by the flexible strap 18 such that arm 86 is located in opening 17 and extends into the interior thereof for a set distance. A layer of non-skid material 100, such as a material sold by Con-Tact Corporation under a tradename of Strip Liner, is attached to housing 65 and located between the clock 64 and wall 16 such that clock 64 is retained in a fixed position with respect to opening 17.

Knob 73 is rotated to set a current the time on clock 64 and the off-on switch 68 is switched on to allow current from a battery 89 to allow a motor to impart a rotational torque to gear 67 and rotate axle 68 for moving second hand 70. When switch 66 is activated on, the second hand 70 moves with respect to the face or dial 78 and informs a person that clock 64 is operating. Knob 75 is rotated and gears 80 move the indicator hand 75 such that projection 77 is brought into engagement with the left side of hour hand 72.

Bait is placed in the enclosure of the cage 10 adjacent the second door 26 and the first door 20 is rotated on pin 22 such that end 21 is brought into engagement with lip 56 to arm the cage 10. The person makes note of the time that the cage 10 was placed in the location and now awaits the migration of animals. It is common for several different species of animals to feed in a same location at different times during a twenty-four time period and through the use of multiple cages 10 it is possible to predict the habits of various animals.

When an animal is attracted to cage 10 by the bait placed in the enclosure, the animal enters through opening 21 in order to reach the bait. In order to reach the bait, the animal must step on platform 48. The weight of the animal causes end 46 to pivot about pin 52 and allow end 23 of door 20 to be released from lip 56. With end 23 released, spring 24 urges door 20 to an upright and closed position as shown in FIG. 4 to trap the animal in the enclosure. When end 23 moves past that portion of arm 86 that extends into opening 17, switch 66 is moved to the off position and the communication of electrical energy from the battery 89 to the motor is terminated to stop clock 64. With clock 64 stopped, the second hand 70, minute hand 72 and hour hand 74 are fixed at the time that switch 66 is moved to the off position.

A cage 10 is usually observed every twenty-four after being placed in a location to determine if an animal has been trapped since the cage 10 was placed in a particular location. As a person approaches a cage 10, if door 20 is closed an animal is most probably being held in cage 10 an precaution is taken to remove the animal without danger to either the animal or the person. On observing that door 20 is closed, a first item is to record the time of the clock 64 as shown in FIG. 7 stopped.

If the indicator hand 76 is on the left-hand side of the hour hand 74, the door 20 was closed and the animal captured within the first twelve hours after the cage 10 was placed in the location. In this situation, the time on the clock 64 is the time that the animal entered the enclosure of the cage 10. If the indicator hand 76 is on the right hand side of the hour hand 74, the animal was captured more than twelve hours after the cage 10 was placed in the location. As illustrated between the time the clock 64 was activated, 4:00 O'clock in FIG. 2 until the time that the clock 64 was stopped, 4:52 in FIG. 7, a time of twelve hours and fifty-two minutes has elapsed so the person know an exact time that the animal entered a cage 10. By having a multitude of cages 10 located over a wide area wherein several species of animals were captured an investigator can predict migration and feeding habits of animals whom share the same feeding area.

The size of the cage 10 can be varies to accommodate for different animals, i.e. mice to bears. In addition, while it may under some situations to use a laser beam as a switching function it is desirable to have the area to remain as undisturbed as possible and as a result where several hundred cages 10 are used the components as disclosed above provide an economical structural relationship to observe the migration of animals.

I claim:

1. A cage for trapping an animal providing an indication of the time that the animal was trapped comprising:

a housing having an opening therein;

a door hinged to the housing and associated with said opening;

closure means that responds to the animal passing through the opening for closing the door to trap the animal in the housing;

clock means secured to said housing and having a second hand, minute hand, hour hand and an indicator hand that move over a dial, said indicator hand including an annular hub which is frictionally retained on a stem and a perpendicular projection that extends to a height of said hour hand; and switch means responsive to the closure of said door to stop said clock means and indicate the time that the door was closed by the relationship of the hour hand and indicator hand, said hour hand independently moving about said stem during a first twelve hours and after said first twelve hours engaging said perpendicular projection to correspondingly rotate said indicator hand until said switch stops said clock, said indicator hand being on the left hand side of said hour hand if the animal was trapped within the first twelve hours after the trap was set and on the right hand side of said hour hand if the animal was trapped more than twelve hours after the trap was set.

2. The cage as recited in claim 1 wherein said clock means includes:

means for setting the minute hand and hour hand to a current time corresponding to the positioning of the cage at a location and for positioning said indicator hand on the left side of said hour hand.

3. The cage as recited in claim 1 wherein said clock means includes:

fastener means for positioning said clock means in a location adjacent said door.

4. The cage as recited in claim 3 further including:

a layer of material located between said clock means and housing to assist in preventing said clock means from moving after being located adjacent said door.

5. The cage as recited in claim 1 wherein said switch means includes:

a lever arm which is activated by the closure of said door to stop the operation of said clock means.

6. The cage as recited in claim 1 wherein said annular hub for said indicator hand includes:

a gap to limit the frictional engagement of said hub with said stem and allow said hour hand to correspondingly move said indicator hand after the passage of said first twelve hours.

* * * * *